Sept. 20, 1938.  P. J. GREULACH  2,130,544
ELECTRIC SOLDERING MACHINE
Filed Oct. 8, 1936  2 Sheets-Sheet 2

Inventor
P. J. Greulach

By Clarence A. O'Brien
Hyman Berman
Attorneys

Patented Sept. 20, 1938

2,130,544

UNITED STATES PATENT OFFICE 2,130,544

ELECTRIC SOLDERING MACHINE

Paul J. Greulach, Fort Wayne, Ind.

Application October 8, 1936, Serial No. 104,694

2 Claims. (Cl. 24—249)

This invention relates to electric soldering machines, and more particularly to that type of electric soldering machine employed by shopmen, jewelers, opticians and the like, for soldering gold, silver and analogous metals.

Heretofore extreme difficulty has been encountered by the average workman in soldering such articles as spectacle frames, or thermalmic mountings and the like due to the fact that one hand must be used in holding the work, leaving free but one hand to manipulate the elements of the soldering tool for accomplishing the soldering operation.

The present invention is therefore particularly concerned with an improved clamp for holding the work in a manner to permit the two hands to be free for performing the soldering operation.

A further object of the invention is to provide a clamp of the character suggested which may be mounted on and made a part of a conventional electric soldering tool.

The invention, together with its objects and advantages will be best understood from a study of the following description taken in connection with the accompanying drawings, wherein—

Figure 1:
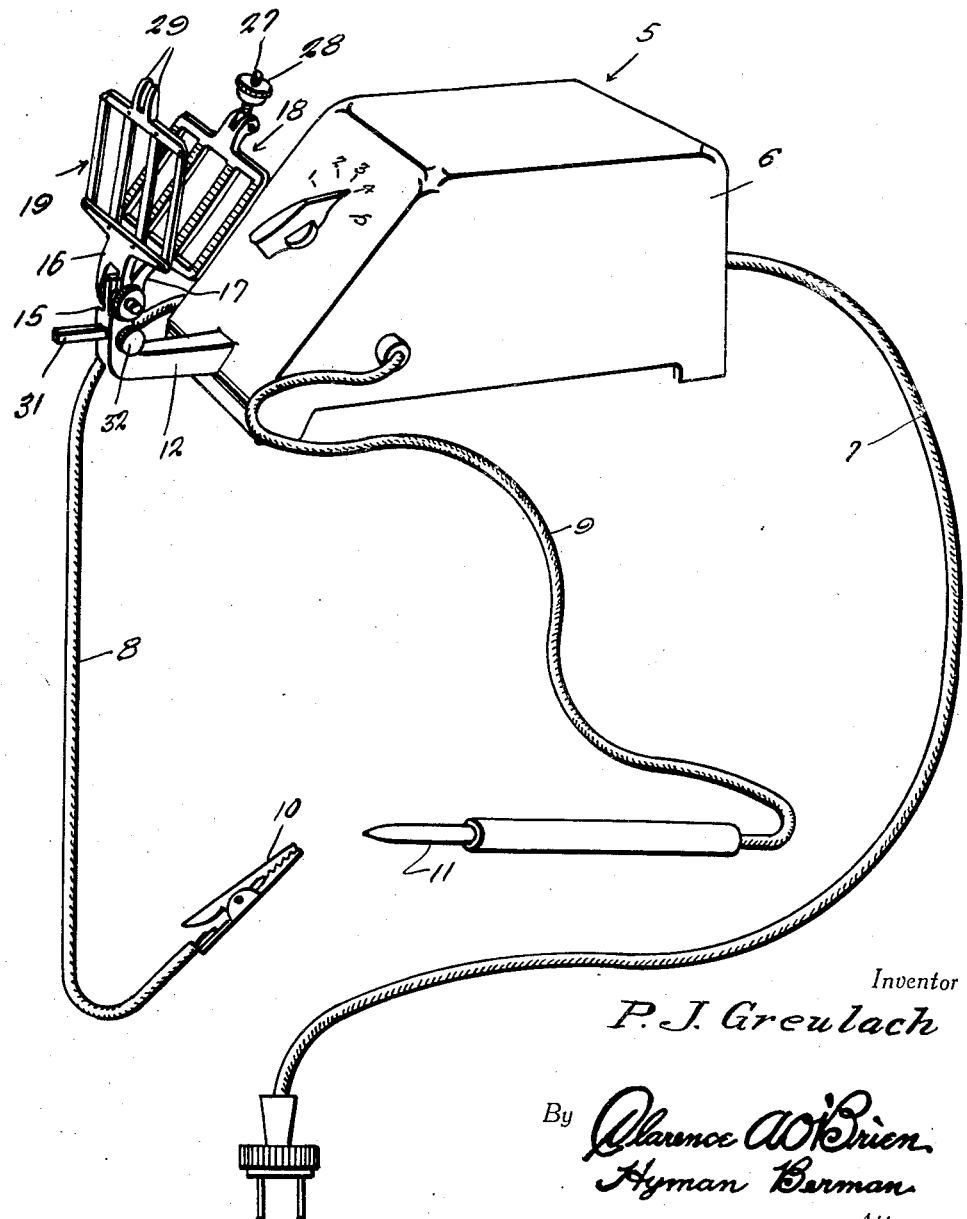
Figure 1 is a perspective view illustrating the application of the invention.
Figure 2:
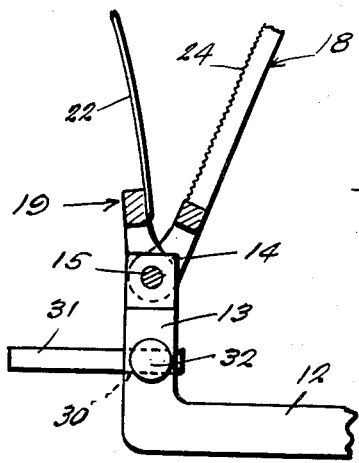
Fig. 2 is a fragmentary detail view of the clamp.
Figure 3:
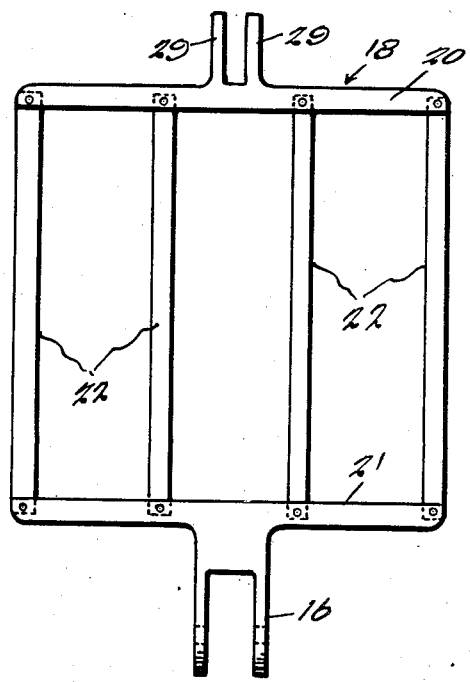
Fig. 3 is an elevational view of one of the jaws of the clamp.
Figure 4:
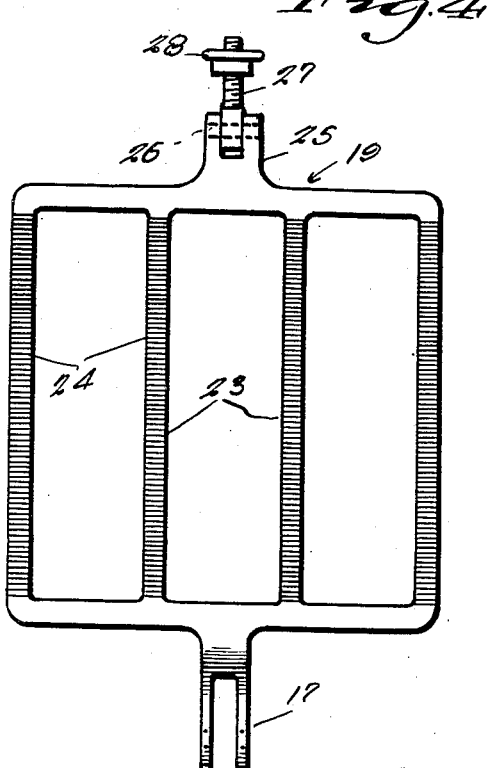
Fig. 4 is a similar view of a complemental jaw.

Referring to the drawings by reference numerals, it will be seen that 5 indicates generally, a conventional and well known type of electric soldering tool, the same being of the character generally employed by jewelers, opticians and the like for soldering purposes.

The tool 5 includes among other parts, the casing 6, electric cord 7, the cords 8 and 9, the clip 10 on the cord 8, and the carbon stick 11 on the cord 9.

In accordance with the present invention, the casing 6, at one end thereof, is provided with an arm 12 which may be made integral with or otherwise secured at one end to the casing 6. At its free end, the arm 12 is provided with an upstanding post 13, that is laterally reduced at its upper end to provide a lug 14 through the medium of which together with bolt 15 and the forked hinged lugs 16, 17 of clamp jaws 18, 19, respectively, said jaws 18 and 19 are hingedly connected together to the post 13 for adjustment into different set positions.

The jaw 19 of the improved clamp comprises top and bottom frame members 20, 21, which are connected by thin metallic resilient and flexible strips 22 welded or otherwise secured at their respective opposite ends to the frame members 20, 21.

Also the jaw member 18 is in the form of a rectangular frame, the top and bottom portions of which are connected by spaced bars 23 and the bars 23 together with the vertical end members 24 of the jaw frame 18, on the sides thereof facing the strips 22 of jaw 19, are corrugated or otherwise formed to provide roughened gripping surfaces 24. The strips 22 are normally bowed or flexed toward the bars 23.

Also the jaw 18, at its upper end, is provided with a bifurcated lug 25 to which is pivoted as at 26, a bolt 27 equipped with a nut 28.

The upper frame member 20 of jaw 18 is provided with a pair of spaced ears 29 adapted to receive the free end of the bolt 27 in a manner to cooperate with the nut 28 for securing the jaws 18 and 19 in clamping relation relative to one another with the work clamped between said jaws.

The post 13 of arm 12 is also provided with a through opening 30 to accommodate a squared carbon stick 31 which latter will be found desirable and necessary when soldering, for example, guard arms to the eye wire which is facilitated by using the clamp attached to a pair of half round optical pliers. The carbon stick 31 is secured at the desired adjustment within the opening 30 through the medium of a set screw 32.

It is obvious that in actual practice, the work to be soldered is clamped between the jaws 18 and 19 of the clamp and will be securely retained between said jaws during the soldering operation. Thus with the clamp of this character so mounted on the casing of the soldering machine, the soldering operation may be formed with facility and expediency, and in a manner leaving both hands of the operator free for use in performing the actual soldering operation.

Having thus described the invention, what is claimed as new is:

1. A clamp for use on a soldering machine including a pair of rectangular frame-like clamping jaws pivotally connected together for relative adjustment into and from opposed clamping relation, each jaw comprising a pair of upper and lower bars, respectively, and a plurality of parallel transverse bars spaced apart and extending between the upper and lower bars, the transverse bars in each jaw opposing those in the other in side-by-side position in the clamping relation of the jaws, the transverse bars in one jaw being resilient and flexible and those in the other jaw being rigid, and cooperating devices on said jaws, respectively, for securing the same together in clamping relation.

2. A clamp for use on a soldering machine including a pair of rectangular frame-like clamping jaws pivotally connected together for relative adjustment into and from opposed clamping relation, each jaw comprising a pair of upper and lower bars, respectively, and a plurality of parallel transverse bars spaced apart and extending between the upper and lower bars, the transverse bars in each jaw opposing those in the other in side-by-side position in the clamping relation of the jaws, the transverse bars in one jaw being resilient and flexible and those in the other jaw being rigid, the resilient flexible bars being normally bowed toward the rigid bars and the latter being corrugated, and cooperating devices on said jaws for securing the same together in clamping relation.

PAUL J. GREULACH.